(12) United States Patent
Tatavarthi et al.

(10) Patent No.: US 12,153,584 B2
(45) Date of Patent: Nov. 26, 2024

(54) COMPLEX EVENT PROCESSING ON SERVER-LESS FRAMEWORK

(71) Applicant: Capital One Services, LLC, McLean, VA (US)

(72) Inventors: Vikram Tatavarthi, Herndon, VA (US); Pradeep Khandelwal, Vienna, VA (US); Kristaps Berzinch, Arlington, VA (US); Pooja Mulik, Ashburn, VA (US); Jonathon Snyder, Alexandria, VA (US); Jeremy Hanford, Reston, VA (US); Sandeep Kumar, Ashburn, VA (US); Sujay Nagendrappa Beesnalli, Herndon, VA (US)

(73) Assignee: Capital One Services, LLC, McLean, VA (US)

(*) Notice: Subject to any disclaimer, the term of this patent is extended or adjusted under 35 U.S.C. 154(b) by 230 days.

(21) Appl. No.: 17/216,411

(22) Filed: Mar. 29, 2021

(65) Prior Publication Data

US 2022/0309068 A1 Sep. 29, 2022

(51) Int. Cl.
*G06F 16/2455* (2019.01)
*G06F 9/54* (2006.01)

(52) U.S. Cl.
CPC ........ *G06F 16/24568* (2019.01); *G06F 9/542* (2013.01); *G06F 16/24565* (2019.01)

(58) Field of Classification Search
CPC ......... G06F 16/24568; G06F 16/24565; G06F 9/542

USPC ......................................................... 707/770
See application file for complete search history.

(56) References Cited

U.S. PATENT DOCUMENTS

| | | | |
|---|---|---|---|
| 10,198,298 B2 | 2/2019 | Bishop et al. | |
| 2018/0295546 A1* | 10/2018 | Crawford | H04L 67/10 |
| 2019/0220331 A1* | 7/2019 | Duggal | G06F 9/542 |
| 2019/0373521 A1* | 12/2019 | Crawford | H04L 9/3236 |
| 2020/0082340 A1 | 3/2020 | Wing et al. | |
| 2020/0259802 A1* | 8/2020 | Goodyear | H04L 69/22 |

OTHER PUBLICATIONS

"Complex Event Processing." Wikipedia, Wikimedia Foundation, Mar. 18, 2021, en.wikipedia.org/wiki/Complex_event_processing. (7 pages, in English).

* cited by examiner

*Primary Examiner* — Giovanna B Colan

(74) *Attorney, Agent, or Firm* — Bookoff McAndrews, PLLC

(57) ABSTRACT

Disclosed are methods, systems, and non-transitory computer-readable medium for server-less complex event processing (CEP). For instance, the method may include hosting a plurality of server-less functions, the plurality of server-less functions including at least a first group of server-less functions, the first group of server-less functions including a driver function and at least one lookup function including a first lookup function; receiving data streams; and processing the data streams, using the driver function and/or the at least one lookup function, to publish a CEP data stream.

20 Claims, 6 Drawing Sheets

COMPLEX EVENT PROCESSING ON SERVER-LESS FRAMEWORK

TECHNICAL FIELD

Various embodiments of the present disclosure relate generally to server-less complex event processing (CEP) and, more particularly, to server-less CEP using a driver function and a lookup function.

BACKGROUND

Combining events published from disparate streaming data sources to trigger a complex event so that a downstream system can act upon the complex event is called complex event processing (CEP). Generally, there are multiple techniques which perform CEP on a dedicated server, which incurs infrastructure costs and maintenance costs while exposing the CEP system to third parties.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for server-less CEP.

For instance, a method may include hosting a plurality of server-less functions, the plurality of server-less functions including at least a first group of server-less functions, the first group of server-less functions including a driver function and at least one lookup function including a first lookup function; receiving data streams; and processing the data streams, using the driver function and/or the at least one lookup function, to publish a CEP data stream.

A system may include a memory storing instructions; and a processor executing the instructions to perform a process. The process may include hosting a plurality of server-less functions, the plurality of server-less functions including at least a first group of server-less functions, the first group of server-less functions including a driver function and at least one lookup function including a first lookup function; receiving data streams; and processing the data streams, using the driver function and/or the at least one lookup function, to publish a CEP data stream.

A non-transitory computer-readable medium may store instructions that, when executed by a processor, cause the processor to perform a method. The method may include: hosting a plurality of server-less functions, the plurality of server-less functions including at least a first group of server-less functions, the first group of server-less functions including a driver function and at least one lookup function; receiving data streams; determining whether any of the data streams are associated with the driver function or the at least one lookup function; responsive to a determination that a first data stream is associated with the at least one lookup function, processing the first data stream, using the at least one lookup function, to determine whether the first data stream includes a first event; responsive to a determination that the first data stream includes the first event, generating, using the at least one lookup function, an event data packet, the event data packet including a key value and event data; causing the event data packet to be stored in a first data store; responsive to a determination that a second data stream is associated with the driver function, processing the second data stream, using the driver function, to determine whether the second data stream includes a second event; responsive to a determination that the second data stream includes the second event, generate a query to determine whether the first data store has particular event data packets that have a particular key value corresponding to the second event; causing the query to be executed on the first data store; receiving a query result for the query; determining whether the query result is sufficient; and responsive to a determination that the query result is sufficient, obtaining the particular event data packets that have the particular key value corresponding to the second event, generating a CEP data stream, and publishing the CEP data stream.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to server-less CEP.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to server-less CEP using a driver function and a lookup function. In particular, a server-less CEP architecture and a framework processes the CEP events exactly once, both in batch or real-time, so as to output a CEP stream when a driver function determines lookup functions have stored required lookup events in a data store. This solution may minimize infrastructure, maintenance, and cost, while being highly available, resilient and self-healing. Moreover, this solution, when supported by a streaming technology, which can invoke the application on an as-need basis (e.g., Kinesis, Lambda, Dynamo DB Stream), the driver functions and lookup functions do not need to be always on (e.g., the driver functions and lookup functions may spawn only when triggered by events).

Figure 1:
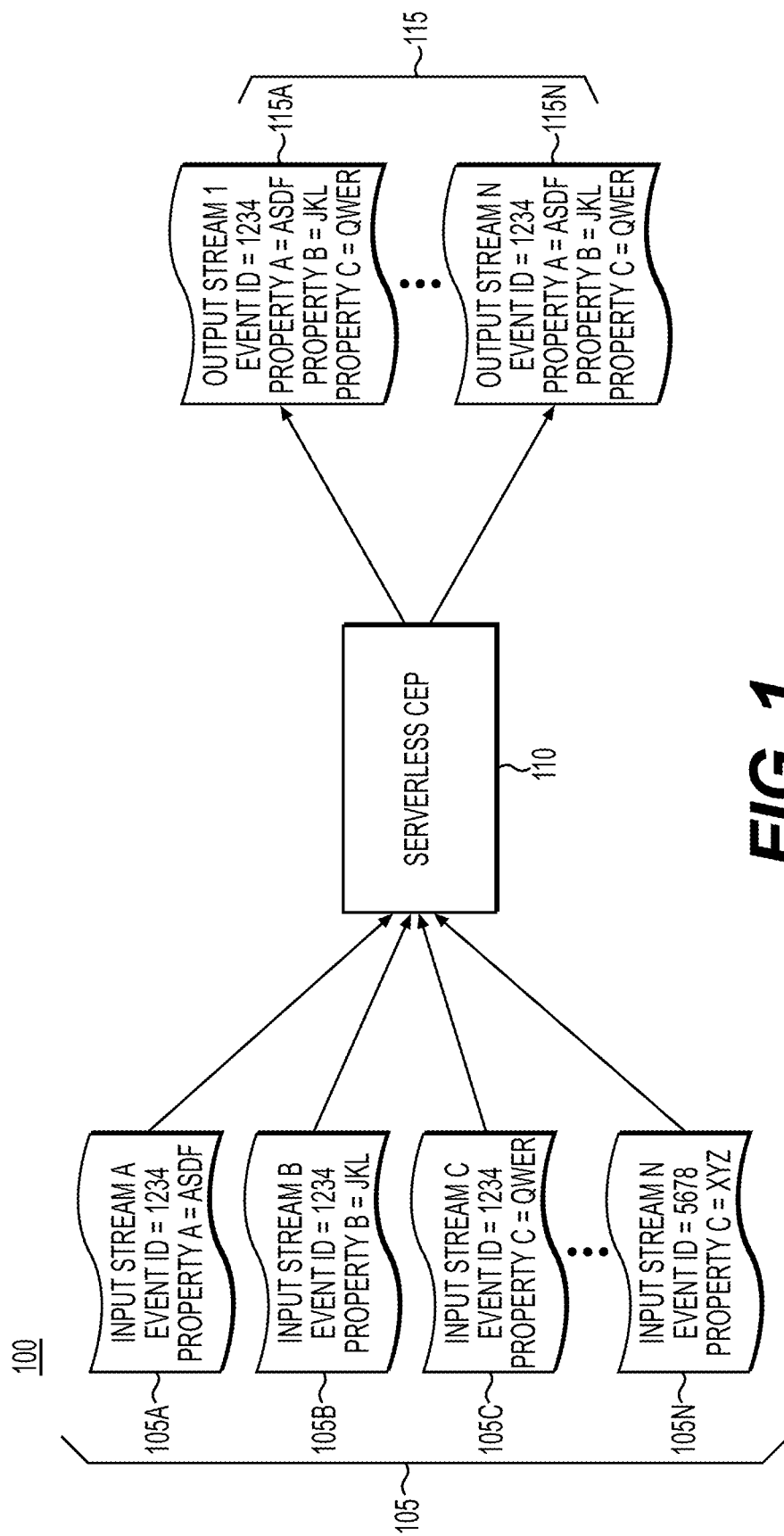
FIG. 1 depicts an exemplary system environment, according to one or more embodiments.

FIG. 1 depicts an exemplary system environment, according to one or more embodiments. The system 100 may include a plurality of streams 105 (including stream A 105A, stream B 105B, stream C 105C, . . . , and stream N 105N), a server-less CEP module 110, and one or more CEP streams 115 (e.g., including CEP stream 115A, . . . , and CEP stream 115N). While four streams 105 and two CEP streams 115 are depicted in FIG. 1, it is to be understood that the disclosure is not so limited. Rather, more or fewer streams 105 and/or more or fewer CEP streams 115 may exist without departing from the scope of this disclosure. The server-less CEP module 110 may process the plurality of streams 105 to generate the one or more CEP streams 115. The server-less CEP module 110 may be hosted on a server/cloud. The server-less CEP module 110 may be run on an as-needed basis, e.g., when a data stream is received by the server/cloud, as discussed below.

The server-less CEP module 110 may include a plurality of server-less functions. Each of the plurality of server-less functions may be functions to execute particular software code on an as-needed basis. The functions may be platform-agnostic lambda functions. The plurality of server-less functions may include one or more lookup functions 205 and at least one driver function 210 (see FIG. 2).

The plurality of server-less functions may include one or more groups of server-less functions. Each group may be a sub-set of all of the plurality of server-less functions. Each group of the server-less functions may publish a particular CEP stream, such as CEP stream 115A or CEP Stream 115N. Each group of the server-less functions may include a driver function and at least one lookup function, so as to publish the particular CEP stream. Each group may have only one driver function, which publishes the relevant CEP stream. Each lookup function may be a member of a single group or a member of multiple groups. For instance, a lookup function may be a member of a first group and a member of a second group, so as to be used by two different driver functions to publish two different CEP streams. Hereinafter, the disclosure will refer to lookup functions 205 and driver function 210 as members of a first group to emphasize certain features of the disclosure, but one of skill in the art would recognize that the techniques disclosed herein may be used for each group of server-less functions. Notably, in the case that a lookup function is a member of two or more groups, that lookup function will execute separate components of the particular software code corresponding to each of the two or more groups.

The plurality of streams 105 may be publication/subscription platforms, such as Kinesis or Kafka platforms. Each of the plurality of streams 105 may output a stream of data (referred herein as "stream," "streams," "data stream," "data streams," etc.) on a pull/push basis. The server-less CEP module 110 may receive the data streams 105, as they are pushed/pulled to the server-less CEP module 110. For instance, not all data streams 105 may be concurrently received, but only the individual data streams 105 that are pulled or pushed to the server-less CEP module 110. For each of the pulled/pushed data streams 105, the pushed/pulled data streams 105 may be received at one or more application programing interface (API) endpoints hosted on the server/cloud that hosts the server-less CEP module 110. In response to receiving the pushed/pulled data streams 105, the server-less CEP module 110 may determine whether one or more of the received pushed/pulled data streams 105 are associated with the lookup functions 205 and/or the driver function 210. If so, the server-less CEP module 110 may invoke a corresponding one or more of the lookup functions 205 and/or the driver function 210, and process the pushed/pulled data streams 105 using the corresponding one or more of the lookup functions 205 and/or the driver function 210. In this manner, the plurality of server-less functions may reduce cost (e.g., by reducing processing instances and/or processing load on the cloud) and increase security (e.g., by not exposing the server-less function when not in use). The lookup functions 205 and driver function 210 may process the data streams 105 to extract event data from each data stream 105. The driver function 210 may determine whether sufficient event data is available to publish the CEP stream 115 for the group.

Figure 2:
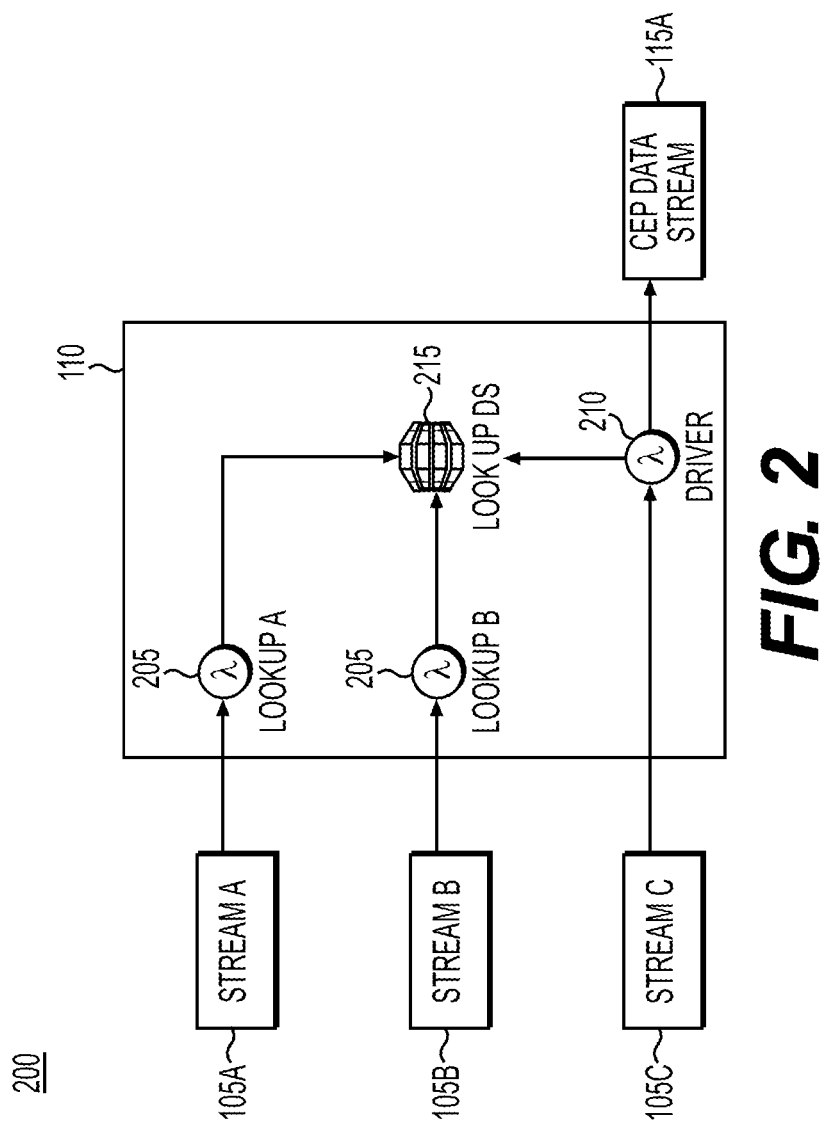
FIG. 2 depicts an exemplary block diagram of a system for server-less complex event processing using a driver function and a lookup function, according to one or more embodiments.

In particular, to process the pushed/pulled data stream 105 using a lookup function 205 (such as lookup A 205 for stream A 105A or lookup B 205 for stream B 105B in FIG. 2, referred to as lookup data stream for clarity), the server-less CEP module 110 may: process the lookup data stream, using the lookup function 205, to determine whether the lookup data stream includes a lookup event; responsive to a determination that the lookup data stream includes the lookup event, generate, using the lookup function 205, an event data packet; and cause the event data packet to be stored in a lookup data store (DS) 215 (see FIG. 2; also referred to as a first data store). The lookup DS 215 may be a relational or non-relational database, such as NoSQL database. One of skill in the art would recognize that there are many ways to implement the lookup DS 215.

To process the lookup data stream to determine whether the data stream includes the lookup event using the lookup function 205, the server-less CEP module 110 may execute a search component of the particular software code associated with the lookup function 205. The search component may search the lookup data stream for a particular key value (e.g., an event identification (ID)). For instance, the search component may parse the lookup data stream into discrete event packets, and determine whether any of the discrete event packets include the particular key value. The discrete event packets may include key values and event data (e.g., data associated with the lookup event to be used by the driver function to populate the CEP stream). If one or more of the discrete event packets include the particular key value, the search component of the lookup function 205 may determine the lookup data stream includes the lookup event.

To generate event data packets using the lookup function 205, the server-less CEP module 110 may extract specific event data from any of the discrete event packets that include the particular key value and generate specific event data packets. The specific event data packets may include the particular key value in association with the specific event data for a specific discrete event packet. In this manner, the lookup event may be stored with the specific event data packets indexed by the particular key value, so that the driver function 210 may retrieve the specific event data.

To cause the event data packet to be stored in the lookup DS 215, the server-less CEP module 110 may transmit the event data packets to the lookup DS 215, so that the event data packets may be stored until retrieved by the driver function 210. Alternatively, the server-less CEP module 110 may execute the storage process for event data packet on the lookup DS 215 itself.

Notably, each lookup function 205 may search for a same key value in their respective lookup data stream to thereby determine whether their respective lookup events have occurred, as each lookup data stream may correspond to a different type of event. In particular, each lookup function 205 may determine whether their respective lookup event has occurred (referred to as a first event, second event, etc. for as many lookup functions 205 that are in the group) and store a corresponding event data packet in the lookup DS 215. In this manner, the server-less CEP module 110 may create a CEP stream 115 for downstream processes based on events separated in time and from discrete lookup data streams.

To process the pushed/pulled stream 105 using the driver function 210 (referred to as a driver data stream for clarity), the server-less CEP module 110 may: process the driver data stream, using the driver function 210, to determine whether the driver data stream includes a driver event; and responsive to a determination that the driver data stream includes the driver event, obtain particular event data packets that have the particular key value (corresponding to the driver event); and generate the CEP data stream 115.

To process the driver data stream to determine whether the driver data stream includes the driver event using the driver function 210, the server-less CEP module 110 may execute a search component of the particular software code associated with the driver function 210. The search component may search the driver data stream for the particular key value. For instance, the search component may parse the driver data stream into discrete event packets, and determine whether any of the discrete event packets include the particular key value. The discrete event packets may include key values and event data (e.g., data associated with the driver event to be used by the driver function 210 to populate the CEP stream 115). If one or more of the discrete event packets include the particular key value, the search component of the driver function 210 may determine the driver data stream includes the driver event.

To obtain the particular event data packets that have the particular key value, the server-less CEP module 110 may: generate a query to determine whether the lookup DS 215 has the particular event data packets that have the particular key value corresponding to the lookup event(s); cause the query to be executed on the lookup DS 215; receive a query result for the query; determine whether the query result is sufficient; and responsive to a determination that the query result is sufficient, obtain the particular event data packets that have the particular key value corresponding to the driver event. To generate the query, the server-less CEP module 110 may form a search for the particular key value to return any event data packets that include the particular key value. One of skill in the art would recognize that this would depend on the type of database the lookup DS 215 is configured as. Either the driver function 210 or the lookup DS 215 execute the query on the event data packets stored in lookup DS 215. The query result indicates any event data packets stored in lookup DS 215 that have the particular key value.

To determine whether the query result is sufficient using the driver function 210, the server-less CEP module 110 may: determine whether a complete set of event data packets are present in the lookup DS 215; responsive to a determination that the complete set of event data packets are present in the lookup DS 215, determine the query result is sufficient; and responsive to a determination that the complete set of event data packets are not present in the lookup DS 215, determine the query result is not sufficient. For instance, the server-less CEP module 110 may determine whether the complete set of event data packets are present in the lookup DS 215 by determining whether each lookup event associated with the driver function 210 (e.g., for a group associated with the driver function 210) has been stored for the particular key value. This may be done by determining whether all characteristics are stored for the CEP data stream 115. In this manner, the driver function 210 may determine whether it has all data needed to publish the CEP data stream 115. In the case that there are one or more missing lookup events, the driver function 210 may determine that it does not have all the data it needs to publish the CEP data stream 115.

To generate the CEP data stream 115, the server-less CEP module 110 may: extract lookup event data from the stored lookup event data packets; extract driver event data from discrete data packets of the driver data stream that have the particular key value; and generate a CEP data stream packet by combining the lookup event data and the driver event data in a defined manner. In this manner, the server-less CEP module 110 may output CEP data stream 115 to be processed by downstream functionalities, only when each lookup event and driver event have occurred.

In one aspect of the disclosure, the driver data stream may have a higher throughput, larger data messages, and/or delayed input relative to the lookup data streams. In the case of higher throughput, this may ensure that the lookup data streams do not delay the driver function 210 and, thus, the CEP data stream. In the case of larger data messages, this may ensure that the lookup DS 215 uses less storage space by storing the lookup event data packets instead of the driver data packets. In the case of delayed input relative to the lookup data streams, this may ensure that the lookup data streams do not delay the driver function 210 and, thus, the CEP data stream.

In another aspect of the disclosure, if driver function 210 determines that the query result is not sufficient, the driver function 210 fails, driver data stream or discrete data packets therein are malformed, and the server-less CEP module 110 may generate an error packet and cause the error packet to be stored in a retry DS 310 (referred to as a second data store), so that the driver function 210 can retry the query responsive to a schedule trigger (e.g., such as schedule trigger 305). Additionally or alternatively, if a lookup function 205 fails or a lookup data stream or packets therein are malformed, the server-less CEP module 110 may generate an error packet and cause the error packet to be stored the retry DS 310. In either case, the error packet may include the entire data stream for a particular period of time (whether lookup data stream or driver data stream), discrete data packets that include the particular key value (whether lookup data stream or driver data stream), or discrete data packets that are malformed (whether lookup data stream or driver data stream). The schedule trigger 305 may be time-based (e.g., every set period of time, such as thirty seconds) or event based (e.g., user input or CEP data stream based) to send a retry instruction to the lookup function 205 and/or the driver function 210.

In response to receiving a retry instruction (including a retry key) from the schedule trigger 305 (either a same or different retry instruction for the lookup functions 205 and the driver function 210), the server-less CEP module 110 may: cause, either/both the driver function 210 or the lookup function(s) 205, to query the retry DS 310 for error packets that have key values corresponding to the retry key; responsive to error packets being returned that have the key values corresponding to the retry key, determine whether the error packets being returned that have the key values corresponding to the retry key and/or event data packets that have key values corresponding to the retry key are sufficient; and responsive to a determination that the error packets being returned that have the key values corresponding to the retry key and/or the event data packets that have the key values corresponding to the retry key are sufficient, generate the CEP data stream 115.

To determine whether the error packets being returned that have the key values corresponding to the retry key and/or event data packets that have key values corresponding to the retry key are sufficient, (1) the lookup function(s) 205 may retrieve their error packets having the key values corresponding to the retry key and process them as if received in their lookup data stream using retry logic, to thereby update the lookup DS 215; and (2) the driver function 210 may retrieve its error packets having the key values corresponding to the retry key and process them as if received in its driver data stream using retry logic. Notably, the error usually will be that a lookup function 205 had not received an event yet to be stored in the lookup DS 215, so the schedule trigger 305 may enable the driver function 210 to publish the CEP stream 115 after the driver event has occurred but the query result returned insufficient to publish. Therefore, the server-less CEP module 110 may be self-healing and self-resolving, even when an expected recordation of events is misaligned.

FIG. 2 depicts an exemplary block diagram of a system 200 for server-less CEP using a driver function and a lookup function, according to one or more embodiments. As shown, system 200 includes the server-less CEP module 110 of FIG. 1 to explain how lookup functions 205 and driver functions 210 interact to publish a CEP data stream 115 (e.g., CEP data stream 115A). In particular, the system 200 includes a lookup function A 205 to process a data stream A 105A, a lookup function B 205 to process a data stream B 105B, and a driver function 210 to process a data stream C. The lookup function A 205, the lookup function B 205, and the driver function 210 may form a group to output the CEP data stream 115A. As discussed above, the lookup functions A and B 205 process the data streams A and B, respectively, to determine whether their respective events are included the data streams. If so, the lookup functions A and B 205 generate lookup event data packets and store them in the lookup DS 215. Parallel to the lookup functions 205 A and B (e.g., at the same time or at a different time), the driver function 210 may process stream C 105C and determine whether a driver event is present in the data stream C 105C. If so, the driver function 210 may query the lookup DS 215 and determine whether the query result is sufficient or not. If the query result is sufficient, the driver function 210 may generate and publish the CEP data stream 115A. In this example, data from three discrete events may be combined in the CEP data stream 115, even though the three discrete events may occur at different times (e.g., days, hours, minutes, or seconds apart from each other) and occur in different systems. Therefore, the server-less CEP module 110 may enable downstream processing for this complex event without incurring substantial maintenance and server time, as the server-less CEP module only runs the individual lookup functions and driver function on an as-needed basis. One of skill in the art would recognize that the group depicted in FIG. 2 is exemplary and that the number of lookup functions 205 and corresponding data streams could be arbitrarily complex, but still output CEP data stream 115A without substantial maintenance and server time. Moreover, one of skill the in the art would recognize that (while not depicted in FIG. 2) a group may have as few as one lookup function and a driver function to handle two data streams.

Figure 3:
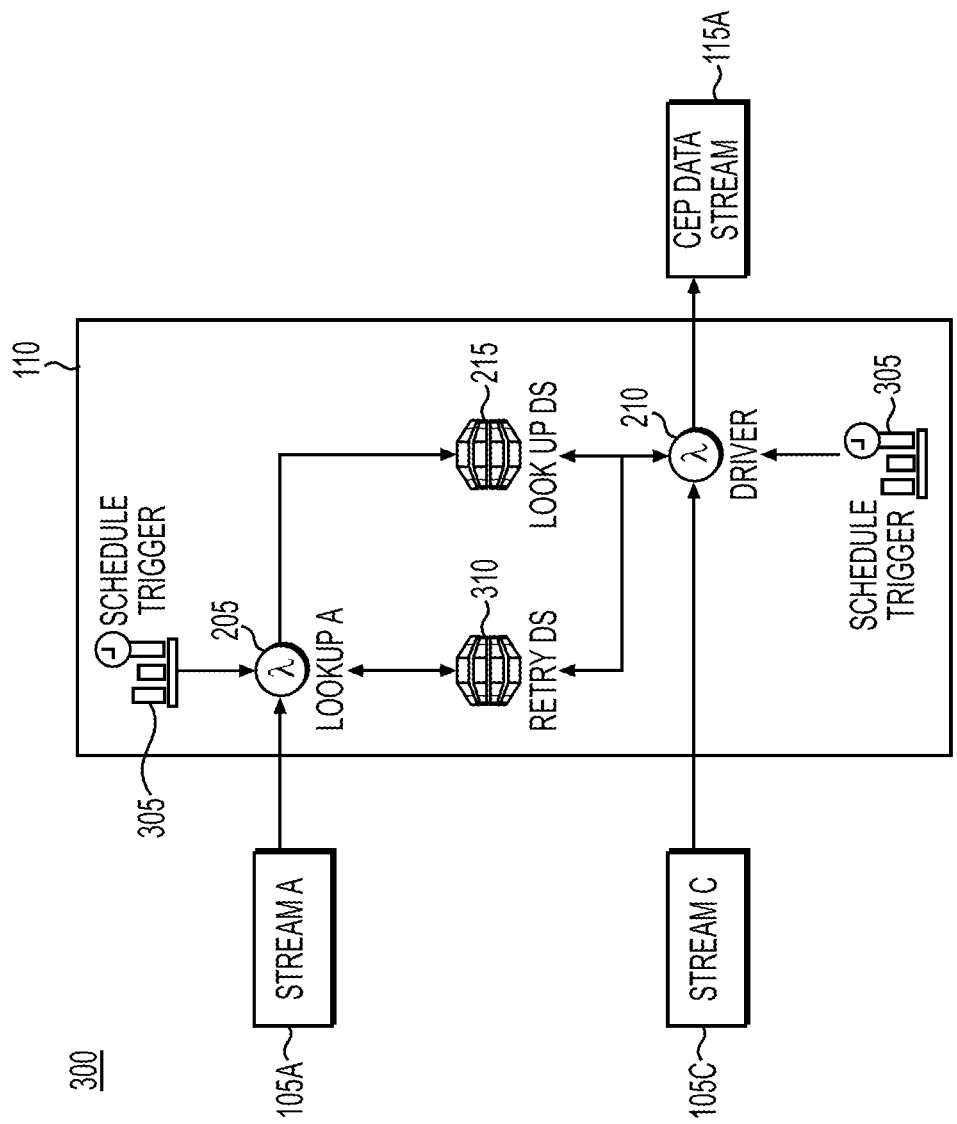
FIG. 3 depicts an exemplary block diagram of a system for server-less complex event processing using a driver function and a lookup function for a retry process, according to one or more embodiments.

FIG. 3 depicts an exemplary block diagram of a system 300 for server-less CEP using a driver function and a lookup function for a retry process, according to one or more embodiments. As shown, FIG. 3 depicts a system 300 including the server-less CEP module 110 of FIG. 1 to explain how lookup functions 205 and driver functions 210 interact to publish a CEP data stream 115 using the retry process. In particular, the system 300 includes at least a lookup function A 205 to process a data stream A 105A and a driver function 210 to process a data stream C 105C. The lookup function A 205 and the driver function 210 may form a group to output the CEP data stream 115A. As discussed above, the lookup function A 205 processes the data stream A 105A to determine whether lookup events are included the data stream A 105A. If so, the lookup function A 205 generates lookup event data packets and stores them in the lookup DS 215. However, in the case that the lookup function A 205 fails or the data stream is malformed, etc. as discussed above, the server-less CEP module 110 may store an error packet in retry DS 310. Parallel to the lookup functions 205 A (e.g., at the same time or at a different time), the driver function 210 may process stream C 105C and determine whether a driver event is present in the stream C 105C. If so, the driver function 210 may query the lookup DS 215 and determine whether the query result is sufficient or not. However, in the case that lookup event has not been stored in the lookup DS 215 yet, the driver function 210 fails, or the stream C 105C is malformed, etc. as discussed above, the server-less CEP module 110 may store an error packet in retry DS 310. In this case, once the schedule trigger 305 outputs a retry instruction, the lookup function A 205 and the driver function 210 may work together to resolve the error and publish the CEP data stream 115A, as discussed above.

Figure 4:
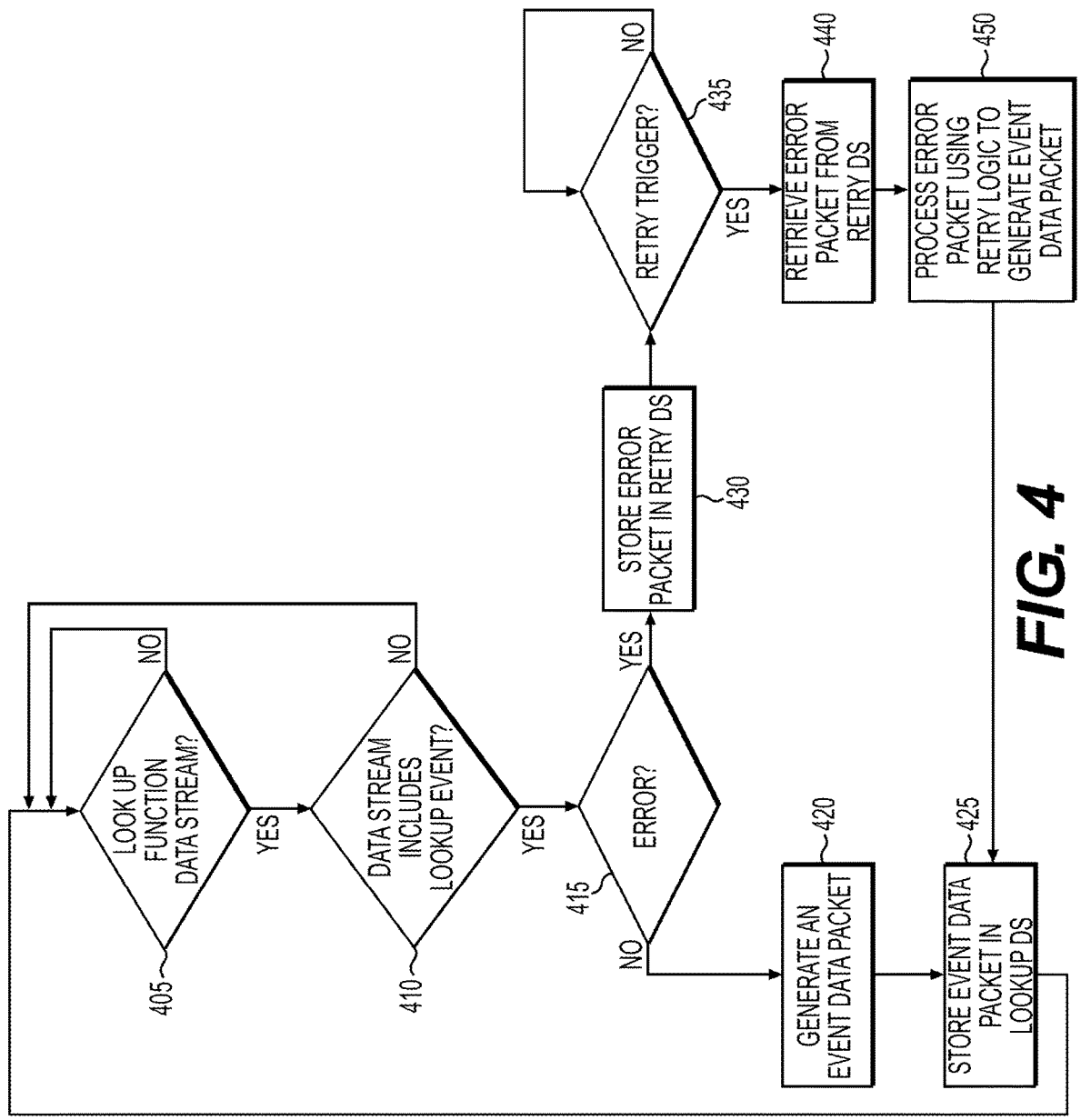
FIG. 4 depicts a flowchart for a lookup function of a server-less complex event processing, according to one or more embodiments.

FIG. 4 depicts a flowchart 400 for a lookup function of a server-less CEP, according to one or more embodiments. The flowchart 400 may be performed by the server-less CEP module 110, discussed above, to implement a lookup function 205 of the present disclosure. The server-less CEP module 110 may start the process of the flowchart 400 by determining whether a received data stream is associated with a lookup function 205 (block 405). For instance, the server-less CEP module 110 may receive a pushed data stream or a pulled data stream at an API endpoint of the server-less CEP module 110, as discussed above with respect to FIG. 1.

In response to determining that the received data stream is not associated with the lookup function 205 (block 405: No), the server-less CEP module 110 may proceed to wait until a data stream that is associated with the lookup function 205 is received (block 405). In response to determining that the received data stream is associated with the lookup function 205 (block 405: Yes), the server-less CEP module 110 may proceed to determine whether the data stream includes a lookup event (block 410). For instance, the server-less CEP module 110 may determine whether the data stream includes a lookup event by using the search component of the lookup function software for the particular key value, as discussed above with respect to FIG. 1.

In response to determining that the data stream does not include the lookup event (block 410: No), the server-less CEP module 110 may proceed to wait until another data stream that is associated with the lookup function is received (block 405). In response to determining that the data stream does include the lookup event (block 410: Yes), the server-less CEP module 110 may proceed to determine whether there is an error (block 415). For instance, the server-less CEP module 110 may determine whether there is an error by determining data packets are malformed, etc., as discussed above with respect to FIG. 1.

In response to determining there is no error (block 415: No), the server-less CEP module 110 may proceed to generate an event data packet (block 420). For instance, the server-less CEP module 110 may generate the event data packet by extracting the event data, as discussed above with respect to FIG. 1. The server-less CEP module 110 may then proceed to store the event data packet in the lookup DS 215 (block 425). The server-less CEP module 110 may then proceed to wait until another data stream that is associated with the lookup function is received (block 405).

In response to determining there is an error (block 415: Yes), the server-less CEP module 110 may proceed to store an error packet in the retry DS 310 (block 430). For instance, the server-less CEP module 110 may store the discrete data packets of the data stream in the retry DS 310, as discussed above with respect to FIG. 1. The server-less CEP module 110 may then proceed to determine whether a retry trigger is triggered (block 435). For instance, the server-less CEP module 110 may determine whether the schedule trigger 305 has issued a retry instruction, as discussed above with respect to FIG. 1. In response to determining the retry trigger is not triggered (block 435: No), the server-less CEP module 110 may proceed to wait until the retry trigger is triggered (block 435) (or return to block 405). In response to determining the retry trigger is triggered (block 435: Yes), the server-less CEP module 110 may proceed to retrieve the error packet from retry DS 310 (block 440). The server-less CEP module 110 may then proceed to process the error packet using retry logic to generate an event data packet (block 450). For instance, the server-less CEP module 110 may replay the stored lookup data stream to process the discrete data packets to generate the event data packet, as discussed above with respect to FIG. 1. The server-less CEP module 110 may then proceed to store the event data packet in lookup DS (block 425). The server-less CEP module 110 may then proceed to wait until another data stream that is associated with the lookup function is received (block 405).

Figure 5:
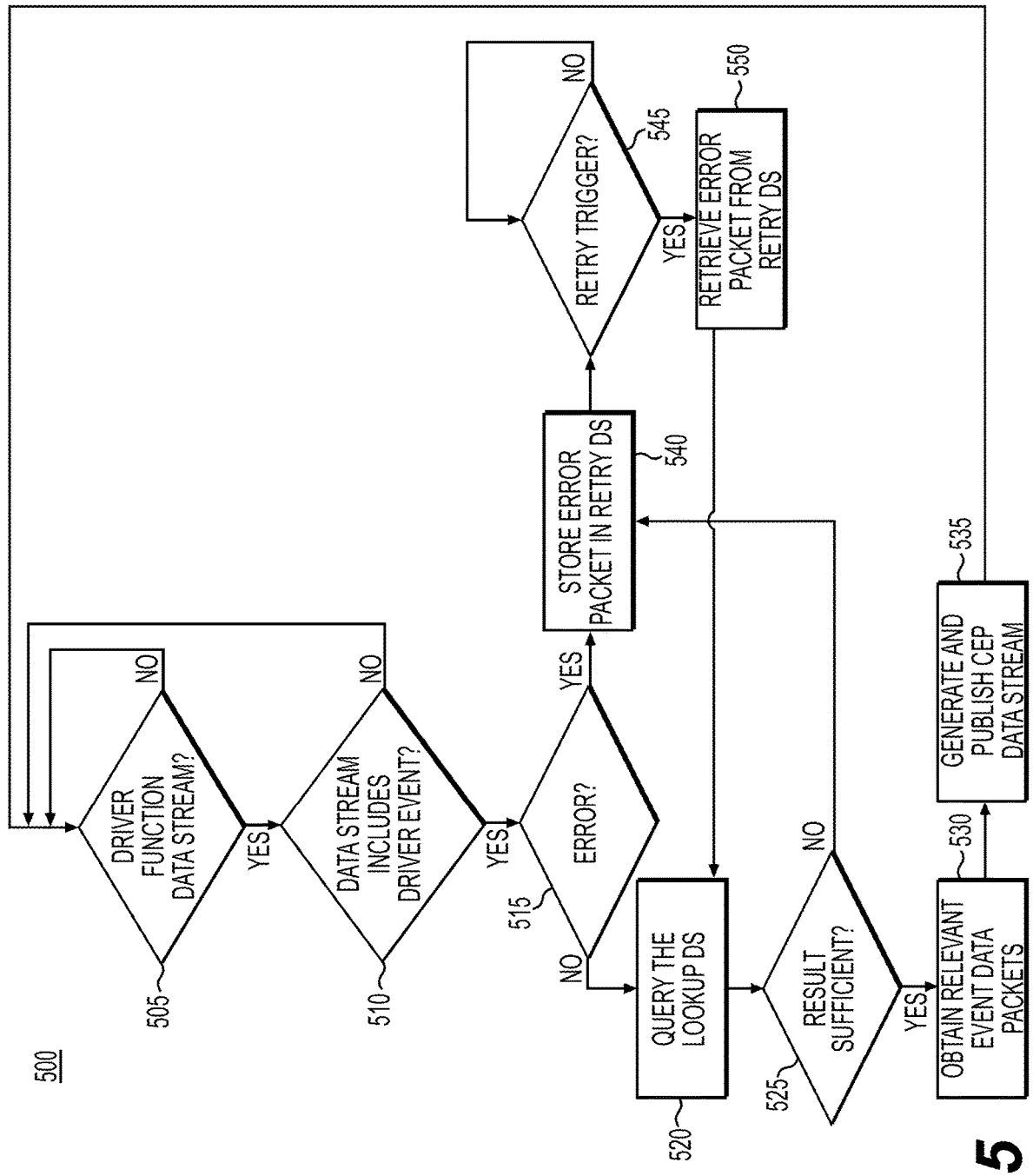
FIG. 5 depicts a flowchart for a driver function of a server-less complex event processing, according to one or more embodiments.

FIG. 5 depicts a flowchart 500 for a driver function of a server-less CEP, according to one or more embodiments. The flowchart 500 may be performed by the server-less CEP module 110, discussed above, to implement a driver function 210 of the present disclosure. The server-less CEP module 110 may start the process of the flowchart 500 by determining whether a received data stream is associated with a driver function 210 (block 505). For instance, the server-less CEP module 110 may receive a pushed data stream or a pulled data stream at an API endpoint of the server-less CEP module 110, as discussed above with respect to FIG. 1.

In response to determining that the received data stream is not associated with the driver function 210 (block 505: No), the server-less CEP module 110 may proceed to wait until a data stream that is associated with the driver function 210 is received (block 505). In response to determining that the received data stream is associated with the driver function 210 (block 505: Yes), the server-less CEP module 110 may proceed to determine whether the data stream includes a driver event (block 510). For instance, the server-less CEP module 110 may determine whether the data stream includes a driver event by using the search component of the driver function 210 software for the particular key value, as discussed above with respect to FIG. 1.

In response to determining that the data stream does not include the driver event (block 510: No), the server-less CEP module 110 may proceed to wait until another data stream that is associated with the driver function 210 is received (block 505). In response to determining that the data stream does include the driver event (block 510: Yes), the server-less CEP module 110 may proceed to determine whether there is an error (block 515). For instance, the server-less CEP module 110 may determine whether there is an error by determining data packets are malformed, etc., as discussed above with respect to FIG. 1.

In response to determining there is no error (block 515: No), the server-less CEP module 110 may proceed to query the lookup DS 215 (block 520). For instance, the server-less CEP module 110 may form the query to find any event data packets that include the particular key value in the lookup DS 215, as discussed above with respect to FIG. 1. The server-less CEP module 110 may then proceed to determine whether the query result is sufficient (block 525). In response to determining the query result is sufficient (block 525: Yes), the server-less CEP module 110 may proceed to obtain relevant event data packets from the lookup DS 215 (block 530). The server-less CEP module 110 may proceed to generate and publish CEP data stream 115 (block 535). The server-less CEP module 110 may then proceed to wait until a data stream that is associated with the driver function 210 is received (block 505).

In response to determining there is an error (block 515: Yes) or in response to determining the query result is not sufficient (block 525: No), the server-less CEP module 110 may proceed to store an error packet in retry DS 310 (block 540). For instance, the server-less CEP module 110 may store the discrete data packets of the driver data stream in the retry DS 310, as discussed above with respect to FIG. 1. The server-less CEP module 110 may then proceed to determine whether a retry trigger is triggered (block 545). For instance, the server-less CEP module 110 may determine whether the schedule trigger 305 has issued a retry instruction, as discussed above with respect to FIG. 1. In response to determining the retry trigger is not triggered (block 545: No), the server-less CEP module 110 may proceed to wait until the retry trigger is triggered (block 545) (or return to block 505). In response to determining the retry trigger is triggered (block 545: Yes), the server-less CEP module 110 may proceed to retrieve the error packet from retry DS 310 (block 550). The server-less CEP module 110 may then proceed to process through blocks 520-535.

Figure 6:
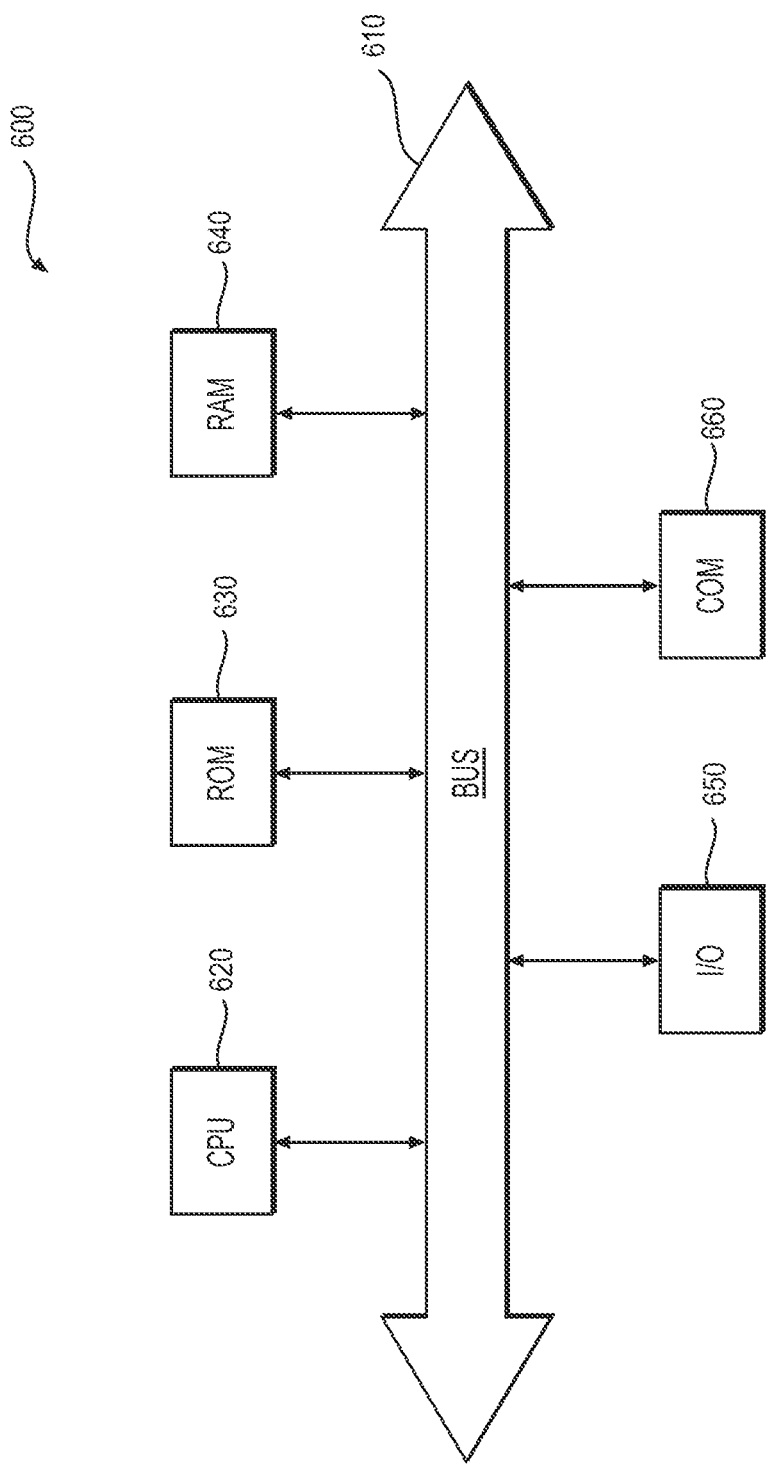
FIG. 6 depicts an example system that may execute techniques presented herein.

FIG. 6 depicts an example system that may execute techniques presented herein. FIG. 6 is a simplified functional block diagram of a computer that may be configured to execute techniques described herein, according to exemplary embodiments of the present disclosure. Specifically, the computer (or "platform" as it may not be a single physical computer infrastructure) may include a data communication interface 660 for packet data communication. The platform may also include a central processing unit ("CPU") 620, in the form of one or more processors, for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for server-less complex event processing (CEP), the computer-implemented method comprising:

hosting a plurality of server-less functions, the plurality of server-less functions including at least a first group of server-less functions, the first group of server-less functions including a driver function and at least one lookup function including a first lookup function, the plurality of server-less functions configured to execute only when associated data streams are received;

receiving data streams, the data streams including:
a first data stream, the first data stream including a plurality of discrete data packets, and
a second data stream, the second data stream including a plurality of discrete data packets, wherein the first data stream is received at a different time than the second data stream;
processing the data streams, using the driver function and/or the at least one lookup function; and
publishing a CEP data stream based on the processing of the data streams using the driver function and/or the at least one lookup function, wherein the CEP data stream includes at least one discrete data packet of the first data stream and at least one discrete data packet of the second data stream, thereby enabling complex event processing to be performed using the plurality of server-less functions configured to execute only when associated data streams are received.

2. The computer-implemented method of claim 1, wherein processing the data streams, using the driver function and/or the at least one lookup function, and publishing the CEP data stream includes:
determining whether any of the data streams are associated with the at least one lookup function;
responsive to a determination that the first data stream is associated with the at least one lookup function, processing the first data stream, wherein the processing the first data stream includes determining, by the at least one lookup function, whether the first data stream includes a first event;
responsive to a determination that the first data stream includes the first event, generating, using the at least one lookup function, an event data packet, the event data packet including a key value and event data; and
causing the event data packet to be stored in a first data store.

3. The computer-implemented method of claim 2, wherein processing the data streams, using the driver function and/or the at least one lookup function, further includes:
determining whether any of the data streams are associated with the driver function;
responsive to a determination that the second data stream is associated with the driver function, processing the second data stream, wherein the processing the second data stream includes determining, by the driver function, whether the second data stream includes a second event; and
responsive to a determination that the second data stream includes the second event, obtaining particular event data packets that have a particular key value corresponding to the second event and generating the CEP data stream.

4. The computer-implemented method of claim 3, wherein obtaining the particular event data packets that have the particular key value corresponding to the second event includes:
generating a query;
causing the query to be executed on the first data store;
receiving a query result for the query;
determining whether the query result is sufficient, wherein the determining whether the query result is sufficient includes determining whether the first data store has the particular event data packets that have the particular key value corresponding to the second event; and
responsive to a determination that the query result is sufficient, obtaining the particular event data packets that have the particular key value corresponding to the second event.

5. The computer-implemented method of claim 4, wherein determining whether the query result is sufficient includes:

determining whether a complete set of event data packets are present in the first data store;
responsive to a determination that the complete set of event data packets are present in the first data store, determining the query result is sufficient; and
responsive to a determination that the complete set of event data packets are not present in the first data store, determining the query result is not sufficient.

6. The computer-implemented method of claim 5, wherein determining whether the query result is sufficient further includes:
responsive to a determination that the query result is not sufficient, generating an error packet and causing the error packet to be stored in a second data store.

7. The computer-implemented method of claim 6, further comprising:
receiving a retry instruction from a schedule trigger, the retry instruction including a retry key;
querying, by either/both the driver function or the at least one lookup function, the second data store for error packets that have key values corresponding to the retry key;
responsive to error packets being returned that have the key values corresponding to the retry key, determining whether the error packets being returned that have the key values corresponding to the retry key and/or event data packets that have key values corresponding to the retry key are sufficient; and
responsive to a determination that the error packets being returned that have the key values corresponding to the retry key and/or the event data packets that have the key values corresponding to the retry key are sufficient, generating the CEP data stream.

8. The computer-implemented method of claim 3, wherein generating the CEP data stream, after obtaining the particular event data packets that have the particular key value corresponding to the second event, includes:
extracting lookup event data from the particular event data packets;
extracting driver event data from the second data stream; and
generating a CEP data stream packet by combining the lookup event data and the driver event data in a defined manner.

9. The computer-implemented method of claim 3, wherein the second data stream has a higher throughput, larger data messages, and/or delayed input relative to the first data stream.

10. The computer-implemented method of claim 1, wherein the plurality of server-less functions include a second group of server-less functions, the second group of server-less functions including a second driver function and at least the first lookup function.

11. A system for server-less complex event processing, the system comprising:
a memory storing instructions; and
a processor executing the instructions to perform a process including:
hosting a plurality of server-less functions, the plurality of server-less functions including at least a first group of server-less functions, the first group of server-less functions including a driver function and at least one lookup function including a first lookup function, the plurality of server-less functions configured to execute only when associated data streams are received;
receiving data streams, the data streams including:

a first data stream, the first data stream including a plurality of discrete data packets, and a second data stream, the second data stream including a plurality of discrete data packets, wherein the first data stream is received at a different time than the second data stream;

processing the data streams, using the driver function and/or the at least one lookup function; and publishing a CEP data stream based on the processing of the data streams using the driver function and/or the at least one lookup function, wherein the CEP data stream includes at least one discrete data packet of the first data stream and at least one discrete data packet of the second data stream, thereby enabling complex event processing to be performed using the plurality of server-less functions configured to execute only when associated data streams are received.

12. The system of claim 11, wherein the process further includes, to process the data streams, using the driver function and/or the at least one lookup function, to publish the CEP data stream:

determining whether any of the data streams are associated with the at least one lookup function;

responsive to a determination that the first data stream is associated with the at least one lookup function, processing the first data stream, wherein the processing the first data stream includes determining, by the at least one lookup function, whether the first data stream includes a first event;

responsive to a determination that the first data stream includes the first event, generating, using the at least one lookup function, an event data packet, the event data packet including a key value and event data; and causing the event data packet to be stored in a first data store.

13. The system of claim 12, wherein the process further includes, to process the data streams, using the driver function and/or the at least one lookup function, to publish the CEP data stream:

determining whether any of the data streams are associated with the driver function;

responsive to a determination that the second data stream is associated with the driver function, processing the second data stream, wherein the processing the second data stream includes determining, using the driver function, whether the second data stream includes a second event; and responsive to a determination that the second data stream includes the second event, obtaining particular event data packets that have a particular key value corresponding to the second event and generating the CEP data stream.

14. The system of claim 13, wherein the process further includes, to obtain the particular event data packets that have the particular key value corresponding to the second event:

generating a query; causing the query to be executed on the first data store;

receiving a query result for the query;

determining whether the query result is sufficient, wherein the determining whether the query result is sufficient includes determining whether the first data store has the particular event data packets that have the particular key value corresponding to the second event; and responsive to a determination that the query result is sufficient, obtaining the particular event data packets that have the particular key value corresponding to the second event.

15. The system of claim 14, wherein the process further includes, to determine whether the query result is sufficient:

determining whether a complete set of event data packets are present in the first data store;

responsive to a determination that the complete set of event data packets are present in the first data store, determining the query result is sufficient; and responsive to a determination that the complete set of event data packets are not present in the first data store, determining the query result is not sufficient.

16. The system of claim 15, wherein the process further includes, to determine whether the query result is sufficient:

responsive to a determination that the query result is not sufficient, generating an error packet and causing the error packet to be stored in a second data store.

17. The system of claim 16, the process further includes:

receiving a retry instruction from a schedule trigger, the retry instruction including a retry key;

querying, by either/both the driver function or the at least one lookup function, the second data store for error packets that have key values corresponding to the retry key;

responsive to error packets being returned that have the key values corresponding to the retry key, determining whether the error packets being returned that have the key values corresponding to the retry key and/or event data packets that have key values corresponding to the retry key are sufficient; and responsive to a determination that the error packets being returned that have the key values corresponding to the retry key and/or the event data packets that have the key values corresponding to the retry key are sufficient, generating the CEP data stream.

18. The system of claim 13, wherein the process further includes, after obtaining particular event data packets that have the particular key value corresponding to the second event:

extracting lookup event data from the particular event data packets;

extracting driver event data from the second data stream; and generating a CEP data stream packet by combining the lookup event data and the driver event data in a defined manner.

19. The system of claim 13, wherein the second data stream has a higher throughput, larger data messages, and/or delayed input relative to the first data stream.

20. A non-transitory computer-readable medium storing instructions that, when executed by a processor, cause the processor to perform a method for server-less complex event processing (CEP), the method comprising:

hosting a plurality of server-less functions, the plurality of server-less functions including at least a first group of server-less functions, the first group of server-less functions including a driver function and at least one lookup function, the plurality of server-less functions configured to execute only when associated data streams are received;

receiving data streams, the data streams including:

a first data stream, the first data stream including a plurality of discrete data packets, and a second data stream, the second data stream including a plurality of discrete data packets, wherein the first data stream is received at a different time than the second data stream;

determining whether any of the data streams are associated with the driver function or the at least one lookup function;

responsive to a determination that the first data stream is associated with the at least one lookup function, processing the first data stream, using the at least one lookup function, and determining whether the first data stream includes a first event;

responsive to a determination that the first data stream includes the first event, generating, using the at least one lookup function, an event data packet, the event data packet including a key value and event data;

causing the event data packet to be stored in a first data store;

responsive to a determination that the second data stream is associated with the driver function, processing the second data stream, using the driver function, to determine whether the second data stream includes a second event;

responsive to a determination that the second data stream includes the second event, generating a query; causing the query to be executed on the first data store;

receiving a query result for the query;

determining whether the query result is sufficient, wherein the determining whether the query result is sufficient includes determining whether the first data store has particular event data packets that have a particular key value corresponding to the second event;

responsive to a determination that the query result is sufficient, obtaining the particular event data packets that have the particular key value corresponding to the second event, generating a CEP data stream; and publishing the CEP data stream based on the processing of the data streams using the driver function and/or the at least one lookup function, wherein the CEP data stream includes at least one discrete data packet of the first data stream and at least one discrete data packet of the second data stream, thereby enabling complex event processing to be performed using the plurality of server-less functions configured to execute only when associated data streams are received.

* * * * *